US008878991B2

(12) United States Patent
Cook

(10) Patent No.: US 8,878,991 B2
(45) Date of Patent: Nov. 4, 2014

(54) DYNAMIC AMBIENT LIGHTING

(75) Inventor: Michael J. Cook, Flemington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/326,624

(22) Filed: Dec. 15, 2011

(65) Prior Publication Data

US 2013/0148020 A1 Jun. 13, 2013

Related U.S. Application Data

(60) Provisional application No. 61/567,783, filed on Dec. 7, 2011.

(51) Int. Cl.
*H04N 7/00* (2011.01)
*H04N 11/00* (2006.01)

(52) U.S. Cl.
USPC .......................................... 348/460; 348/552

(58) Field of Classification Search
USPC ......... 348/553, 602, 603, 739, 473, 478, 725, 348/470, 460; 700/90; 725/153; 375/240.26; 340/641, 642, 691.6, 340/815.65–67
See application file for complete search history.

(56) References Cited

U.S. PATENT DOCUMENTS 4,807,031 A 2/1989 Broughton et al.
5,655,945 A 8/1997 Jani
6,014,184 A 1/2000 Knee et al.
6,415,438 B1 7/2002 Blackketter et al.
6,564,108 B1 5/2003 Makar et al.
6,611,297 B1 * 8/2003 Akashi et al. ................. 348/739
6,698,020 B1 2/2004 Zigmond et al.
6,742,188 B1 5/2004 Del Castillo
7,071,897 B2 * 7/2006 Bronson .......................... 345/7
7,180,529 B2 * 2/2007 Covannon et al. ............ 345/690
7,269,843 B2 9/2007 Yamaguchi et al.
7,316,487 B2 * 1/2008 Hirata et al. .................. 362/345
7,369,903 B2 5/2008 Diederiks et al.
7,616,262 B2 11/2009 Eves et al.
7,752,642 B2 7/2010 Lemmons
7,932,953 B2 4/2011 Gutta et al.
2002/0038157 A1 * 3/2002 Dowling et al. ................ 700/90
2002/0056087 A1 5/2002 Berezowski et al.

(Continued)

OTHER PUBLICATIONS

Partial European Search Report—EP12196159.3—Mailing date: Apr. 2, 2013.

(Continued)

*Primary Examiner* — Victor Kostak
(74) *Attorney, Agent, or Firm* — Banner & Witcoff, Ltd.

(57) ABSTRACT

Systems, methods, software, and data structures that provide dynamic ambient lighting synchronized to a video program being watched in a premises are described herein. A video program may be associated with a predefined lighting scheme that specifies or identifies a time-sequenced set of lighting effects (e.g., flashing police lights, sunrise, explosion, etc.) that are to be performed by the dynamic ambient lighting system time-synchronously with the video program. Components of the dynamic ambient lighting system may extract the lighting scheme from video data, parse the lighting scheme into individual lighting effects, and then control a single-color or multicolor light source associated with each of a plurality of light channels (e.g., front right, rear right, front left, rear left, center, and burst channel, among others) based on time-sequenced lighting primitives defined by each lighting effect. Light sources may be wirelessly controlled, e.g., using an IEEE 802.15.4 or ZigBee-compliant wireless system.

18 Claims, 6 Drawing Sheets

(56) References Cited

U.S. PATENT DOCUMENTS

| | | | | |
|---|---|---|---|---|
| 2003/0057884 | A1* | 3/2003 | Dowling et al. | 315/291 |
| 2003/0081834 | A1 | 5/2003 | Philomin et al. | |
| 2003/0149975 | A1 | 8/2003 | Eldering et al. | |
| 2003/0149980 | A1 | 8/2003 | Hassell et al. | |
| 2004/0015983 | A1 | 1/2004 | Lemmons | |
| 2004/0032536 | A1* | 2/2004 | Islam et al. | 348/722 |
| 2004/0117840 | A1 | 6/2004 | Boudreau et al. | |
| 2005/0028208 | A1 | 2/2005 | Ellis et al. | |
| 2005/0223237 | A1 | 10/2005 | Barletta et al. | |
| 2006/0100880 | A1* | 5/2006 | Yamamoto et al. | 704/270 |
| 2007/0033533 | A1 | 2/2007 | Sull | |
| 2007/0133212 | A1 | 6/2007 | Lin et al. | |
| 2007/0157260 | A1 | 7/2007 | Walker | |
| 2008/0062196 | A1* | 3/2008 | Rackham | 345/619 |
| 2009/0046477 | A1 | 2/2009 | Salters | |
| 2009/0094628 | A1 | 4/2009 | Lee et al. | |
| 2009/0123086 | A1* | 5/2009 | Iwanami et al. | 382/274 |
| 2009/0150925 | A1 | 6/2009 | Henderson | |
| 2009/0193455 | A1 | 7/2009 | Ahn et al. | |
| 2009/0219305 | A1 | 9/2009 | Diederiks et al. | |
| 2009/0249428 | A1 | 10/2009 | White et al. | |
| 2010/0177247 | A1 | 7/2010 | Sekulovski et al. | |
| 2010/0213873 | A1* | 8/2010 | Picard et al. | 315/297 |
| 2010/0213876 | A1 | 8/2010 | Adamson et al. | |
| 2010/0238664 | A1 | 9/2010 | Steenbergen | |
| 2010/0244745 | A1* | 9/2010 | Wendt | 315/312 |
| 2010/0265414 | A1 | 10/2010 | Nieuwlands | |
| 2011/0190911 | A1* | 8/2011 | Iwanami et al. | 700/90 |
| 2011/0215725 | A1 | 9/2011 | Paolini | |
| 2013/0055330 | A1 | 2/2013 | Igoe | |

OTHER PUBLICATIONS

"ZigBee RF4CE Overview and Technical Summary", ZigBee Alliance, 2012.

"Captain Power and the Soldiers of the Future", downloaded from Wikipedia on Mar. 13, 2013, <http://en.wikipedia.org/wiki/Captain_Power>.

Extended European Search Report—EP12196159.3—Mailing Date: Jun. 26, 2013.

Garry Whittaker, "Let there be Ambilight—AMBX—How to get the Philip's Ambilight effect in media center without buying a new TV", Jul. 26, 2010, downloaded from <http://thedigitallifestyle.com/w/index/php/2010/07/26/let-there-be-ambilight-ambx-how-to- . . . >, 6 pages.

Ben Holmes, "VenueMagic 2.5 Show Control Software", Jan. 24, 2012, downloaded from <http://www.venuemagic.com/>, 5 pages.

"The Death of Ineffective Conferences and Presentations?", downloaded from <http://www.ambx.com/>, 3 pages.

"Amblone: DIY Ambilight", downloaded from <http://amblone.com/>, 3 pages.

"Philips' new 9000 series Smart LED TV offers teh best full HD 3D cinematic experience", Press Information, Philips Mar. 8, 2011, 4 pages.

Thomas Ricker, "Fujikom LeDenQ Z-Wave wireless LED lightbulb is a world's first", Jan. 13, 2012, downloaded from <http://www.theverge.com/2012/1/13/2705079/wireless-LED-z-wave-fujikon-ledenq>, 19 pages.

"Energate Implements ZigBee Smart Energy to Balance the Needs of Utilities and Empower Consumers", ZigBee Success Story, 2009, 2 pages.

"Multi Color LED, Part No. 08L5015RGBC", product details, Electronix Express, 2 pages.

"88W8688 Integrated MAC/Baseband/RF WLAN and Bluetooth SoC Product Brief", Nov. 30, 2009, Marvell, 6 pages.

"Marvell 88EM8080/88EM8081 Digital Flyback PFC Controller for LED Lighting Applications", product overview, Aug. 2010, Marvell, 2 pages.

* cited by examiner

| Chan. | 8-bit red | 8-bit blue | 8-bit green | 8-bit white | Duration |
|---|---|---|---|---|---|
| 110000 | 00000000 | 11111111 | 00000000 | 00000000 | 0000000111110100 |
| 001100 | 11111111 | 00000000 | 00000000 | 00000000 | 0000000111110100 |
| 000011 | 00000000 | 00000000 | 00000000 | 00000000 | 0000000000000000 |
| 110000 | 11111111 | 00000000 | 00000000 | 00000000 | 0000000111110100 |
| 001100 | 00000000 | 11111111 | 00000000 | 00000000 | 0000000111110100 |

| Chan. | 8-bit red | 8-bit blue | 8-bit green | 8-bit white | Duration |
|---|---|---|---|---|---|
| 000001 | 00000000 | 00000000 | 00000000 | 00000000 | 0000000000000000 |
| 111110 | 00000000 | 00000000 | 00000000 | 00000000 | 0000000001100100 |
| 111110 | 00000101 | 00000000 | 00000101 | 00000101 | 0000000001100100 |
| 111110 | 00000101 | 00000000 | 00000101 | 00001010 | 0000000001100100 |
| 111110 | 00001010 | 00000000 | 00001010 | 00001111 | 0000000001100100 |
| 111110 | 00001010 | 00000000 | 00001010 | 00010100 | 0000000001100100 |
| ⋮ | | | | | |
| 111110 | 11111000 | 00000000 | 11111000 | 11101011 | 0000000001100100 |
| 111110 | 11111000 | 00000000 | 11111000 | 11110000 | 0000000001100100 |
| 111110 | 01111101 | 00000000 | 01111101 | 11110101 | 0000000001100100 |
| 111110 | 01111101 | 00000000 | 01111101 | 11111010 | 0000000000000000 |

| Time | Effect ID | Duration (ms) | Rpt. | |
|---|---|---|---|---|
| 16:34.2 | 1 | 10000 | 1 | (Police Car) |
| 23:12.5 | 2 | 0 | 0 | (Sunrise) |
| 0 | 2001 | 30000 | 0 | (Gradual return to default) |
| 36:08.8 | 3 | 0 | 0 | (Sunset) |
| 0 | 2003 | 5000 | 0 | (blackout) |
| 0 | 2001 | 45000 | 0 | (Gradual return to default) |

801

DYNAMIC AMBIENT LIGHTING

CROSS-REFERENCE TO RELATED APPLICATIONS

This application is a non-provisional application of provisional application No. 61/567,783, filed Dec. 7, 2011, and having the same title.

FIELD

Aspects described herein are related to control systems and methods for lighting. More specifically, aspects described herein provide methods and systems for dynamically altering ambient lighting responsive to, for example, content in a video program being presented on a display device.

BACKGROUND

Premises viewing of media programs (e.g., television programs, movies, streaming video, and the like) has become increasingly popular as the cost of movie-theater-like televisions, screens, and sound systems become more affordable for mainstream consumers. However, there remains an ever-present need to improve the viewing experience and immersion level for viewers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to systems and methods that effect dynamic alteration of ambient lighting in a video viewing environment (e.g., a retail, commercial or consumer-environment) to enhance a viewing experience while watching a media program such as a television show, on-line video game, streaming video, movie, or the like.

According to a first aspect, an apparatus (e.g., a media gateway, set top box, server, router, or the like), includes one or more processor(s) and memory storing computer readable instructions that, when executed by the processor, configure the apparatus to control ambient lighting. The apparatus may be configured to receive media program data (e.g., via cable, LAN, wireless, coaxial network, fiber optic network, hybrid fiber/coax, satellite TV, IP network, or other content distribution network) that includes, for example, video data and lighting data. In certain aspects, the video data and lighting data may be time synchronized and the apparatus may be configured to extract the video and lighting data out of the media program data. Further, the apparatus may be configured to output ambient lighting instructions which interoperate with ambient lighting devices so as to control the ambient lighting in a manner responsive to the video content currently being displayed. The lighting instructions may be variously configured. In certain aspects, they may define timed ambient lighting effects for multiple light channels, where each light channel is associated with, for example, a location of a light source in relation to a location of a display screen displaying video. These light sources may be variously configured to include bulbs (e.g., halogen, mercury vapor, incandescent), fluorescent, and/or LED technologies). LEDs in particular are considered today very energy efficient, and may be adapted for use as described herein particularly given the flexibility configuring light output for such items as light frequencies, on/off frequencies, focusing via lenses, use of different colors, and color temperatures.

According to various aspects, an ambient lighting system may have different numbers of light channels. For example, in a first aspect, an ambient lighting system might include 6 light channels: front right, front left, rear right, rear left, center, and burst channels. In another aspect, 8 channels may be included: front right, front left, middle right, middle left, rear right, rear left, center, and burst channels. In some aspects, other light channels may be used, e.g., overhead left/right/middle, floor left/right/middle, etc.

Each light channel may be associated with a light source such as a LED, florescent, etc. For example, light sources in two table lamps on either side of a sofa may correspond to rear left and rear right light channels, respectively. According to some aspects, each light source may include multiple colored strands of light emitting diode (LED) lights. For example, in one aspect a light source includes a red LED strand, a blue LED strand, and a green LED strand. The light source may also include a white LED strand to assist with brightness and/or softness of a particular color.

According to some aspects, lighting instructions may also be configured to include lighting primitives which may themselves control such things as effects and schemes to control the various light channels and light sources. A lighting primitive may be variously configured but in illustrative aspects may be one or more lighting instructions that provide one or more control values (e.g., intensity, frequencies, directions, colors) which may be associated with one or more light source (e.g., one per color LED strand). The light primitives may be usable by a light source to adjust various parameters associated with the light source such as the color and intensity of light emitted by the light source. The lighting instructions may also include lighting effects. For example, lighting effects may refer to a predefined sequence of one or more lighting primitives that, when executed in sequence, causes the one or more light sources in the ambient lighting system to generate a predefined visual effect (e.g., flashing lights on a police car, sunrise, sunset, moonlight, explosions, fire, search lights, etc.).

In some aspects, a lighting effect is not directly usable to adjust an output of a light source, but rather corresponds to a predefined sequence of lighting primitives that are output to a light source which itself has a controller for directly adjusting parameters such as color and intensity values of the light source. The lighting instructions may also define one or more lighting schemes. A lighting scheme may be variously defined such as a sequenced set of one or more lighting effects (or primitives) that may correspond and/or be time-synchronized to a particular video program. In illustrative embodiments, lighting instruction sent to a light source may include a reference to a lighting effect, lighting scheme, and/or to a lighting primitive. The lighting instructions may provide methods of operation and may be stored on computer readable media which may also store other types of software instructions.

According to a further aspect, a lighting controller may be configured to, for example, wirelessly send lighting instructions to each light source associated with a light channel. The lighting instruction may be sent in the form of a data message having a first data field identifying one of the light channels, and a second data field storing a lighting instruction for the light source associated with the light channel identified in the first data field. The lighting instruction may be variously configured such as to define an intensity value for a different one of a plurality of colored lights associated with the light channel identified in the first data field. Alternatively or additionally, the lighting instruction may identify a predefined lighting effect stored in a memory of the light source. In certain aspects, lighting instruction may further include a third data field identifying a period of time during which the lighting instruction is maintained by the light source associated with the light channel identified in the first data field.

According to some aspects, a light source may include a plurality of strands of light emitting diodes (LEDs), where each LED strand is a different color (e.g., red, blue, green; or red, blue, green, white). The light source may further include one or more wireless receiver(s) configured to receive lighting instruction, and one or more processors (e.g., microcontroller(s), control logic, and/or microprocessor(s)) configured to control, for example, each of the plurality of LED strands. By actuating one or more of the plurality of LED strands at one or more intensity levels and frequencies, the processor can create substantially any color of light in a visual color spectrum and/or lighting appearance. In aspects, the processor may further be configured to receive ambient lighting instructions from the wireless receiver, and then selectively actuate each of the plurality of LED strands to produce a resulting color and intensity of light based on the lighting instruction.

According to some aspects, the lighting instructions may further include a time component instructing the microprocessor to maintain an output as a specified color, frequency, and/or intensity for a specified period of time.

In some aspects, the light source's wireless receiver may be IEEE 802.15.4 or ZigBee compliant receiver.

According to different aspects, the light source is associated with one of the light channels in an lighting system, and executes lighting instructions intended for the light channel with which that light source is associated. In one example, each light source is manufactured as being associated with a particular light channel. In another example, memory controls, dip switches, and/or other indication may be used to identify a light channel with which the light source is associated. In yet another example, the light source may include a button or toggle that, when actuated, places the light source in a pairing mode to pair the light source with a particular light channel.

In one aspect, the light source may be adapted or configured, when receiving a first type of lighting instruction, to actuate each of the plurality of LED strands based on intensity data received for each of the plurality of LED strands in the first type of ambient lighting instruction, and when receiving a second type of ambient lighting instruction, to actuate each of the plurality of LED strands based on one of a plurality of predefined lighting effects stored in a memory of the light source and identified in the second type of lighting instruction.

According to various aspects, lighting effects may define various visual patterns or appearances created by the combination of light channels (via their respective light sources) in an ambient lighting system. Lighting effects may also define transitions without identifying raw lighting values. For example, a lighting effect may instruct a light source to transition to a default state or other lighting state that the light source was in prior to receiving the lighting instruction (e.g., return to a lighting color/level that a viewer set the light source at prior to watching the video program).

These and other aspects will be readily apparent upon reviewing the detailed description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Illustrative embodiments provide methods and system for dynamically altering lighting in a room when a media program is playing, based on the content in the media program. Stated differently, aspects described herein define how to alter ambient lighting based on the content in a television show, movie, or other video program. For example, during a sunrise, ambient lighting might get stronger to enhance the viewer's sensory perception of the sun rising; during a sunset the ambient lighting might be reduced to enhance the viewer's sensory perception of the sun going down; during a scene in which a police car is shown with flashing lights, ambient lighting might increase and decrease in alternating cycles between left and right portions of the room to enhance the viewer's sensory perception of a police car with flashing lights. A large number of embodiments exist based on the content being shown in a media program. Aspects described herein define methods and systems defining lighting schemes, associating lighting schemes with a video program, communicating the lighting information to a viewer's terminal equipment, and controlling lighting within a room based on the received lighting information.

Figure 1:
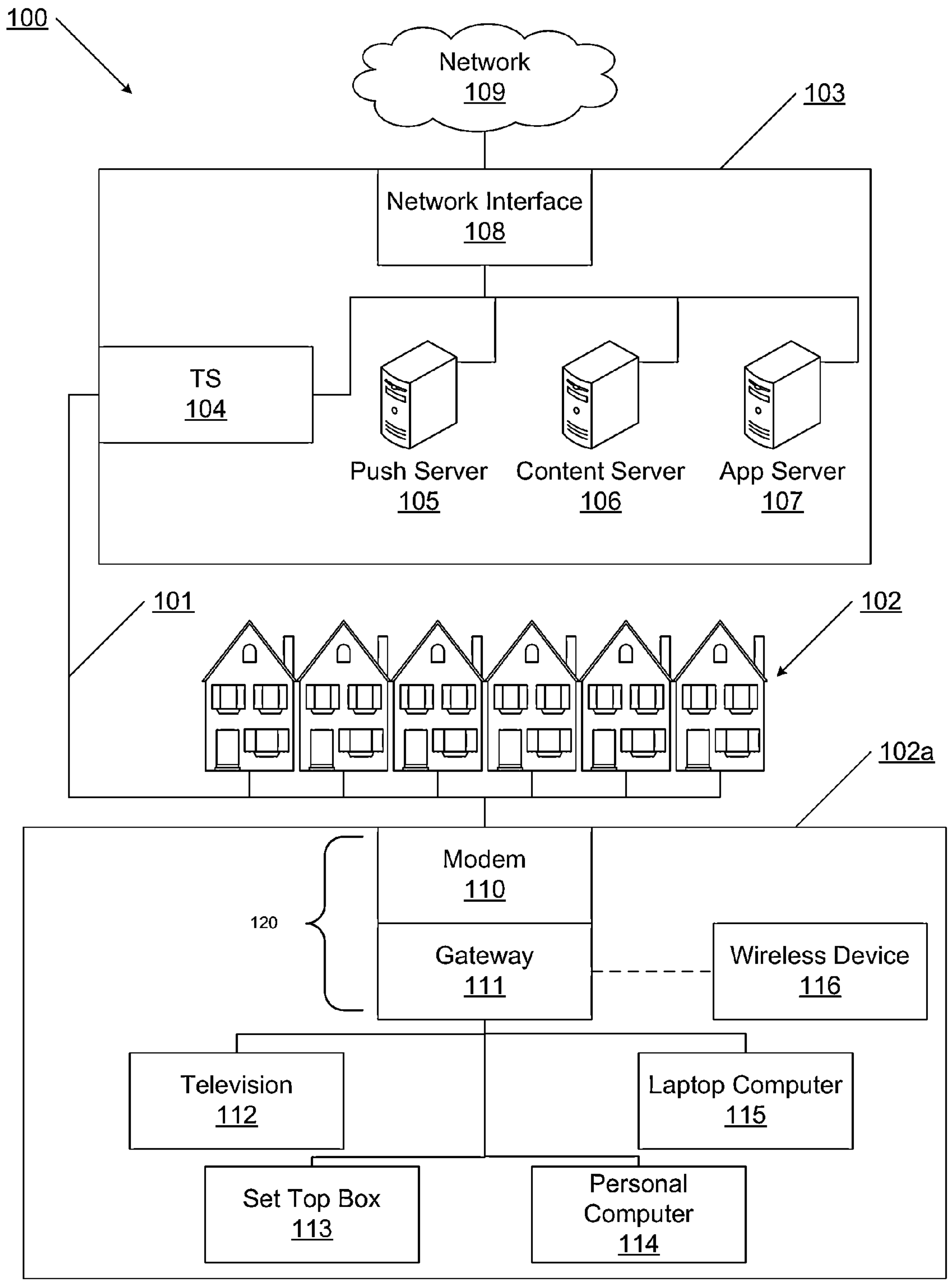
FIG. 1 shows an illustrative embodiment of a portion of a content distribution network according to one or more aspects described herein.

FIG. 1 illustrates an example of an information distribution network 100 in which many of the various features described herein may be implemented. Information distribution network 100 may be any type of information distribution network, such as fiber, coax, hybrid fiber/coax, wired, LAN, WAN, satellite, telephone, cellular, wireless, etc. Illustrative information distribution networks 100 may use one or more (e.g., a series of) communication channels 101 (e.g., lines, coaxial cables, LAN, WAN, optical fibers, wireless, etc.) to connect multiple premises 102 (e.g., businesses, offices, apartment buildings, homes, consumer dwellings, etc.) to a central location 103 (e.g., a local service office, telephone central office, server room, video headend, etc.). The central location 103 may transmit downstream information signals onto the channels 101, and each premises 102 may have a receiver used to receive and/or process those signals.

There may be one or more communication channels 101 originating from the central location 103, and the communication channels may traverse one or more different paths (e.g., lines, routers, nodes, hubs) to distribute the signal to various premises 102 which may be, for example, many miles distant from the central location 103. The communication channels 101 may include components not illustrated, such as splitters, filters, amplifiers, etc. Portions of the communication channels 101 may also be implemented with fiber-optic cable, while other portions may be implemented with coaxial cable, other lines, or wireless communication paths.

The central location 103 may or may not include an interface 104 (such as a termination system (TS), router, modem, cable modem termination system, fiber termination system, etc.) which may include one or more processors configured to manage communications between devices on the communication channels 101 and/or backend devices such as servers 105-107 (to be discussed further below). Interface 104 may be as specified in a suitable communication standard, such as the Data Over Cable Service Interface Specification (DOCSIS) standard, published by Cable Television Laboratories, Inc. (a.k.a. Cable Labs), 802.11, FDDI, MPLS. Interface 104 may also use a custom standard such as a similar or modified interface device to a standard interface. Interface 104 may be variously configured to include time division, frequency division, time/frequency division, wave division, etc. In one illustrative embodiment, the interface 104 may be configured to place data on one or more downstream frequencies to be received by modems at the various premises 102, and to receive upstream communications from those modems on one or more upstream frequencies. The central location 103 may also include one or more network interfaces 108, which can permit the central location 103 to communicate with various other external networks 109. These external networks 109 may include, for example, networks of Internet devices, telephone networks, cellular telephone networks (3G, 4G, etc.), fiber optic networks, local wireless networks (e.g., WiMAX), satellite networks, PSTN networks, internets, intranets, the Internet, and/or any other desired network. The interface 108 may include the corresponding circuitry needed to communicate on the external network 109, and/or to other devices on the external.

As noted above, the central location 103 may include a variety of servers 105-107 that may be configured to perform various functions. For example, the central location 103 may include a push notification server 105. The push notification server 105 may generate push notifications to deliver data and/or commands to the various premises 102 in the network (or more specifically, to the devices in the premises 102 that are configured to detect such notifications, e.g., ambient lighting devices). The central location 103 may also include a content server 106. The content server 106 may be one or more processors/computing devices that are configured to provide content to users in the premises. This content may be, for example, video on demand movies, television programs, songs, text listings, etc. The content may include associated lighting instructions. The content server 106 may include software to validate user identities and entitlements, locate and retrieve requested content, encrypt the content, and initiate delivery (e.g., streaming) of the content to the requesting user and/or device. The content server 106 may also include segmented video where lighting instructions are inserted into the video and associated with particular segments of video.

The central location 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. The program guide may be variously configured. In one embodiment, the program guide will display an indication (e.g., an icon) indicating that the program is ambient lighting enabled. For example, the program guide may include an icon of a static or dynamically changing light bulb indicating that the particular program is ambient lighting enabled. Another application server may be responsible for monitoring user viewing habits and collecting that information for use in selecting advertisements. Additionally, the lighting instructions may be included in advertisements. In one illustrative embodiment, the room brightens markedly when an advertisement appears on the program. Another application server may be responsible for formatting and inserting advertisements in a video stream being transmitted to the premises 102. Another application server may be configured to operate ambient lighting devices manually via controls input by the user from a remote device such as a remote control, IPHONE, IPAD, tablet, laptop computer, and/or similar device. Still referring to FIG. 1, an illustrative premises device 102*a*, such as a gateway device or set top box, may include an interface 120. The interface 120 may comprise a modem 110, which may include one or more transmitters, receivers etc., used to communicate on the communication channels 101 and with the central location 103. The modem 110 may be, for example, a coaxial cable modem (for coaxial cable communication channels 101), a fiber interface node (for fiber optic communication channels 101), a wireless modem (for wireless communication channels 101), and/or any other desired modulation/demodulation device. The modem 110 may be connected to, or be a part of, a gateway interface device 111. The gateway interface device 111 may be a computing device that communicates with the modem 110 to allow one or more other devices in the premises 102 to communicate with the central location 103 and other devices beyond the central location. The gateway 111 may be a set-top box (STB), digital video recorder (DVR), computer server, fiber interface device, media gateway, router, wireless router, and/or other desired computing device. The gateway 111 may also include (not shown) local network interfaces to provide communication signals to devices in the premises, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, etc.

Figure 2:
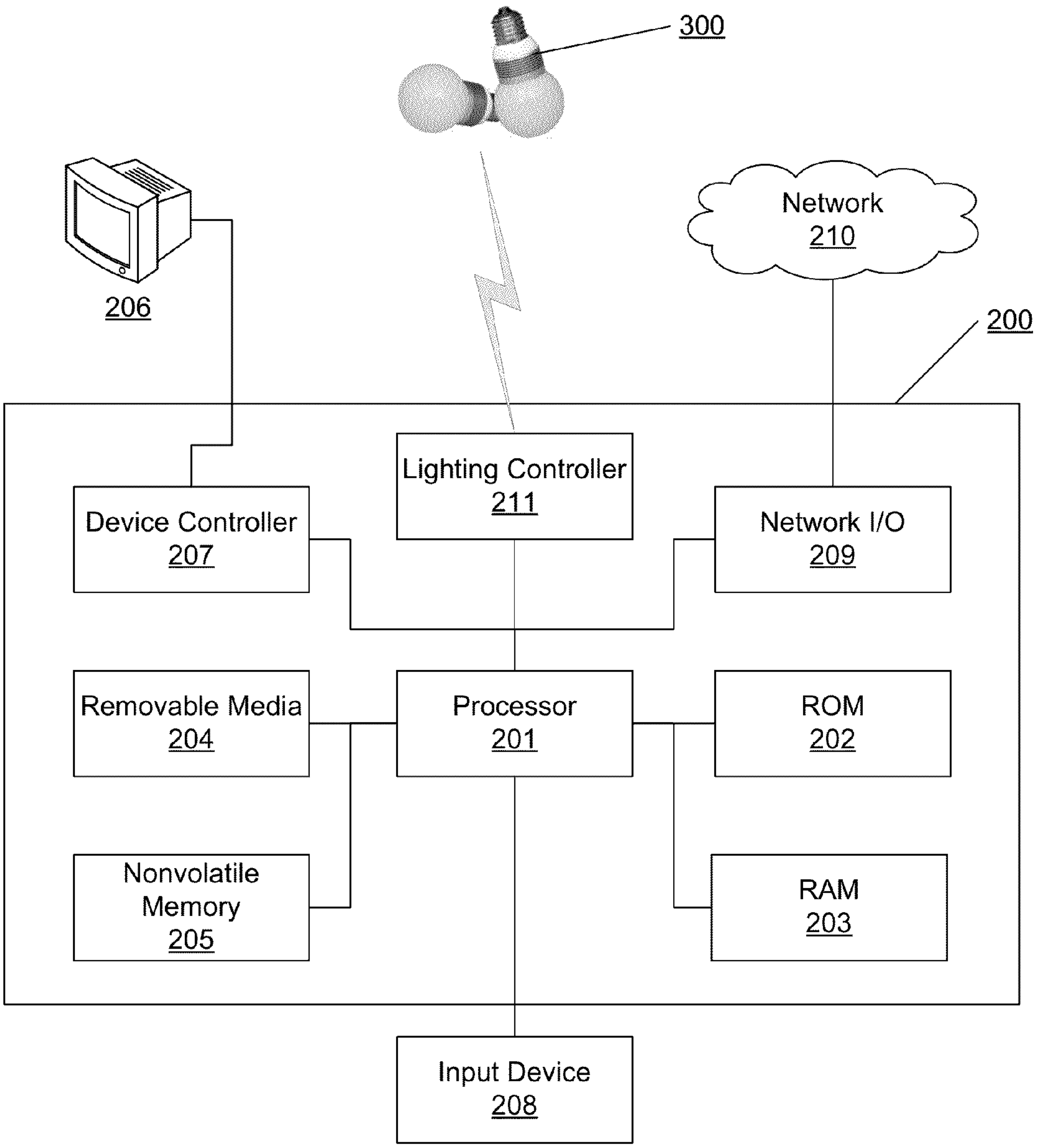
FIG. 2 shows an illustrative hardware platform on which the various elements described herein may be implemented according to one or more aspects described herein.

FIG. 2 illustrates general hardware elements that can be used to implement any of the various devices discussed above. In illustrative embodiments, the computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, smart phone, tablet, mouse, touch screen, microphone, etc. The computing device 200 may also include one or more network interfaces, such as input/output circuits 209 (such as a network card) to communicate with an external network 210. The network interface may be a wired interface, wireless interface, and/or fiber interface, etc. In some embodiments, the interface 209 may include a modem (e.g., a cable modem). In embodiments, network 210 may include communication channels 101 discussed above, the external network 109, an in-premises network, a provider's wireless, coaxial, fiber, or hybrid fiber/coaxial distribution system (e.g., a DOCSIS network), or any other desired network.

Lighting controller 211 may dynamically control one or more light sources 300 (e.g., a light fixture and/or the bulb therein), as further described herein, via one or more networks, e.g., wireless, wired, powerline, Wi-Fi, Bluetooth, and/or Zigbee-compliant networks. Presently there exist approximately 1 billion incandescent light sources in residential premises in the US. Aspects of this disclosure makes these light sources much more versatile, controllable, and adaptable to the users.

Figure 3:
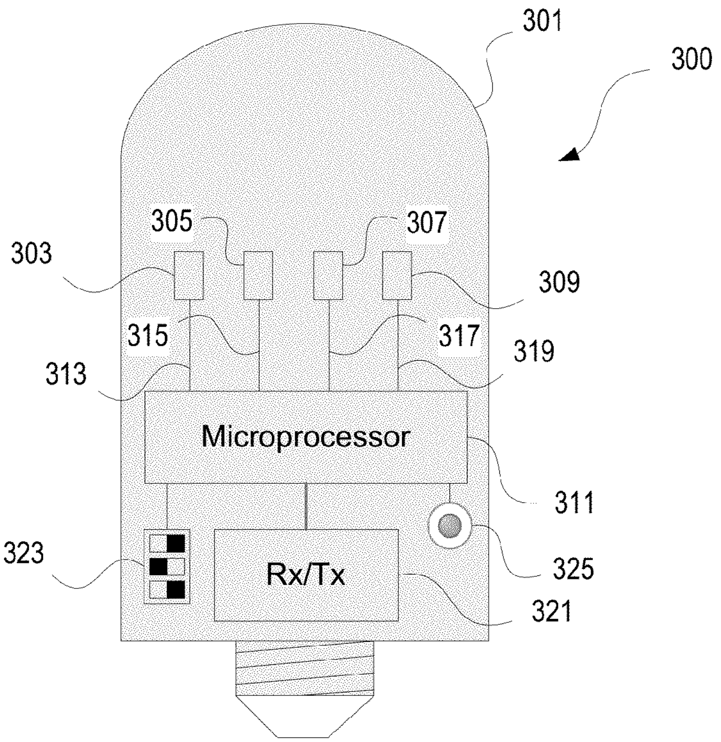
FIG. 3 shows an illustrative diagram of a four-strand LED light source according to one or more aspects described herein.

With reference to FIG. 3, an illustrative light source 300 is shown. In this embodiment, the light source 300 may be configured as a 4-color LED. The 4-color LED bulb may be variously configured to contain strands of light emitting diodes (LEDs). These LEDs can be manufactured in any color. Light source 300 may be variously configured to include clear, red, blue, and green LED strands, giving light source 300 the ability to create any color and light intensity possible with any frequency based on changing the intensity levels of various strands.

Light source 300 may also include a housing 301 in which any number of LEDs may be included (e.g., four light emitting diode strands 303-309). Housing 301 may include a standard base so that the light source 300 can be screwed into any conventional lamp or fixture. The LEDs within the light source 300 may be variously configured. For example, LED 303 may include a red LED; LED 305 may be blue LED; LED 307 may be a green LED; LED 309 may be a high intensity white LED. LEDs 303-309 may be connected to, for example, one or more processors 311 using any suitable means such as control logic and/or via control wires 313, 315, 317, 319, respectively. Processor 311 may be variously configured. In one illustrative embodiment, processor 311 is manufactured by Marvell Technology Group Ltd. of Bermuda and Santa Clara, Calif., and is configured to control the LED strands within the light source, e.g., turning up or down the intensity, or "volume", of one or more of the LED strands.

In illustrative embodiments, the light source 300 may be configured to include a media access control address (e.g., MAC address). The Mac address may register with the computing device 200 and/or with devices located proximate to the central location 103. In illustrative embodiments, the processor 311 (or light source 300) is initially manufactured having a unique media access control (MAC) address. The processor 311 may control the LEDs based on communication signals (e.g., lighting instructions) received via transceiver 321, when those communication signals are addressed to the MAC address associated with that light source. Transceiver 321 may be variously configured to include, for example, a Wi-Fi, Bluetooth, IEEE 802.15.4, or ZigBee-compliant transceiver. Light source 300 may further include one or more dip switches 323 to set various parameters associated with the light source 300, and may further include an input button 325 which may be used to place light source 300 in a designated mode, e.g., a pairing mode, as further described herein.

According to some embodiments, transceiver 321 may instead consist only of a receiver, and not include the ability to output send data. According to other embodiments, light 300 might include only 3 LEDs, omitting the high-intensity white LED. Light source may be variously configured such that processor 311 and/or transceiver 321 may be mounted in the base of the housing 301. In illustrative embodiments, an application downloadable to a remote control device (e.g., an i-Pad/i-Phone) may be utilized to set and/or control the light source either alone and/or in conjunction with the lighting instructions. The remote control may override the lighting instructions and/or enable the lighting instructions. Further, the remote control may set parameters for the lighting instructions such as minimum lighting levels.

Figure 4:
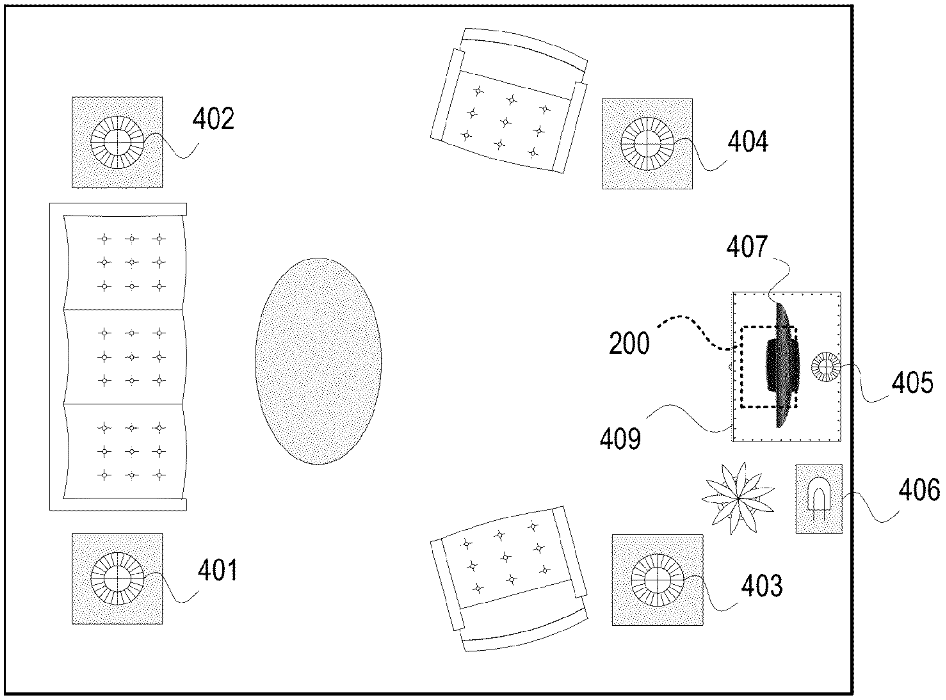
FIG. 4 shows an illustrative room diagram for a multi channel ambient lighting system according to one or more aspects described herein.

With reference to FIG. 4, a room 400 may include multiple light sources (e.g., lamps 401-405). In this example, each of the light sources 300 use the illustrative light source 300 as shown in FIG. 3. In this example, each lamp 401-405 may be a common household lamp (floor lamp, table lamp, light fixture, recessed light, etc.) using a light source 300 as described herein. Lamp 406 may include a special high-intensity bulb that, when lit to a high intensity, significantly lights up the entire room. Lamp 406 may be referred to as a burst lamp, akin to a subwoofer of light, whereby an intense brightness is generated to provide a sudden sensation of light. Lamp 401 may be placed in a rear right position with respect to a viewing angle of television 407; lamp 402 may be placed in a rear left position; lamp 403 may be placed in a front right position; lamp 404 may be placed in front left position; and lamp 405 may be placed behind TV 407 in a center position. Lamp 406 may be placed in a discreet position, e.g., behind a plant or other obstacle, so as to prevent a viewer from looking directly at lamp 406 when lamp 406 is fully engaged. The remote control device may associate the light sources 300 with a planar view of the area such as that shown on FIG. 4. Using ranging or other suitable mechanism, the light sources may detect the distance from for example, the television and/or set top device, and then display the relative location on a control device (e.g., an IPAD or other tablet device).

Each light source 300 may be controlled by its respective internal processor 311. Each processor, in turn, may control the LEDs in that light source based on instructions received via wireless transceiver 321. These instructions may be manual instructions from a remote and/or lighting instructions as discussed above. According to one illustrative aspect, with reference to FIG. 5, the instructions received via transceiver 321 may be received as a sequence of primitives 500, where each primitive identifies a MAC address 501, a sequence of raw intensity values 503, 505, 507, 509, followed by a duration 511. MAC address 501 may be configured to identify a lamp 401-406 within room 400. Intensity values 503-509 may be variously configured and in illustrative embodiments use an 8-bit relative intensity value for each of LEDs 303, 305, 307, 309, respectively, where 0 is off, and 11111111 indicates full intensity. Duration 511 may also be variously configured and in one illustrative embodiment includes 16 bits to indicate, in milliseconds, how long the microprocessor should maintain that state before either reverting to a previous state or implementing a subsequently received primitive. In this example, 16 bits provides for up to 65,536 milliseconds (a little over a minute). According to one embodiment, a duration of 0 (represented as 16 zeros) might have special meaning, indicating that the state defined by that primitive shall be maintained indefinitely until a next primitive is received.

Figures 5, 6, 7:
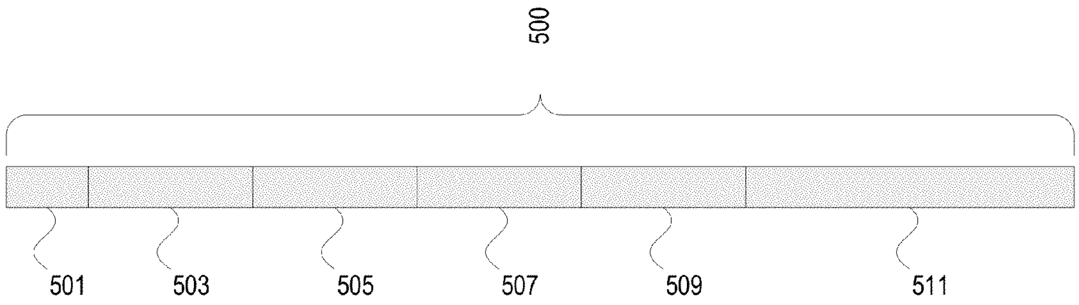
FIG. 5 shows an illustrative data structure for a lighting primitive according to one or more aspects described herein.
FIG. 6 shows an illustrative data structure for a police car lighting effect according to one or more aspects described herein.
FIG. 7 shows an illustrative data structure for a sunrise lighting effect according to one or more aspects described herein.

With reference to FIG. 6, an illustrative set of primitives may be predefined as a lighting effect. For example, a first set of primitives (illustrated in FIG. 6) that, when executed by light sources associated with lamps 401-406 result in various actions. For example, left and right light channels alternately flashing red and blue lights, thereby simulating flashing lights of a police car, may be designated as lighting effect 1. A second set of primitives that cause light sources in lamps 401-406 to gradually increase in soft yellow light, thereby simulating a rising sun, may be designated as lighting effect 2 (or 10 in binary) in this example. Yet another set of primitives that cause light sources in lamps 401-406 to gradually decrease in light, thereby simulating a setting sun, may be designated as effect 3. In illustrative embodiments, any number of lighting effects may be predefined with corresponding effect IDs known to all relevant devices. For example, lighting effects may be created to simulate a single searchlight circling overhead, multiple searchlights circling in opposite directions, a lighthouse light, headlights, stadium lights, strobe lighting, discotheque lights, dance club lights, stage lighting, light-sabers, explosions, rockets, etc. A virtually infinite number of lighting effects are possible, and are limited only by the lighting designer's creativity using the tools described herein.

Lighting effects may be defined by creatively determining sequences of lighting primitives for each of a plurality of light channels. Each light channel may be associated with a particular location of a light source corresponding to that channel. For example, in one aspect, 6 light channels may be used: front right, front left, rear right, rear left, center front, and burst channels. Each of the left, right, and center channels may be associated with a single and/or multicolor bulb as described herein, whereas the burst channel may be associated with a single bright white light source that can be used to present bright light bursts (e.g., during explosions, search lights, etc.). In another aspect, 2 additional channels may be used as well: middle left, middle right, where each middle channel is located between its respective front and rear channels, and each associated with a multicolor bulb. In other aspects, different or additional channels may be used, e.g., floor channels, ceiling channels, dim channels, strobe channels, or other special purpose channels. Special purpose channels may be associated with a special purpose light source, e.g., burst channel, strobe channel, etc. For illustrative purposes only, the remainder of this description assumes that 6 channels are being used, as illustrated in Table 1 below, where channels 401-405 use a multicolor LED bulb, and burst channel 406 uses a single color high lumen white bulb.

In additions, additional primitives may be defined for video games. For example, in car chase scenes in grand theft auto, police lights may be shown as the police are closing in on the player's vehicle. Further, headlights may appear when another car is being passed. The video games video sequences may also include lighting instructions as herein defined. These lighting instructions may appear in on-line versions of the games as well as local versions.

FIG. 6 shows an illustrative embodiment of effect 1, representative of flashing lights on a police car. The channel field may be variously configured such as being 6 bits long indicating, for each lamp 401-406, whether that primitive applies to that lamp. According to an aspect, each bit may correspond to one lamp as shown in Table 1. Each lamp position in Table 1 may be individually referred to as a light channel.

TABLE 1

| Bit | Lamp |
|---|---|
| 1 | Front Left 404 |
| 2 | Rear Left 402 |
| 3 | Front Right 403 |
| 4 | Rear Right 401 |
| 5 | Center 405 |
| 6 | Burst 406 |

As shown in FIG. 6, the first primitive indicates that the left channel (front and rear left lamps) are set to full blue for ½ second. The second primitive indicates that the right channel (front and rear right lamps) are set to full red for ½ second. The third primitive indicates that the center and burst lamps are turned off until further instructions for those lamps are received. The fourth and fifth primitives indicate that the right and left channels swap red for blue, respectively.

FIG. 7 illustrates examples of primitives that may be used to define effect 2, i.e., a sunrise. The specific primitives in FIG. 7 are illustrative only, and indeed many different sets of primitives may be used to define a sunrise. In addition, multiple different sunrise effects may be predefined and be assigned different effect IDs. Each effect's design may vary depending on the desired ambiance.

In the sunrise effect example illustrated in FIG. 7, red and green light is used in combination with white light to provide an increasing soft yellow glow. A first primitive indicates that the burst channel (000001) shall remain off until further instructions for the burst channel are received. This results from a duration of 0 which, by agreement, is understood to mean that the primitive shall be maintained on that channel until an overriding primitive or instruction is received.

The remainder of the primitives examples, excepting the last primitive shown in FIG. 7, illustrate that, every 0.1 sec., the white channel is gradually increased from 0 (off) to almost full brightness (245 out of 255 intensity levels) in increments of 5. The primitive examples also illustrate that, every 0.2 sec., the red and green channels are simultaneously increased from 0 (off) to mid-range (125) in increments of 5, thereby adding a soft yellow glow to the sunrise effect. The final primitive example in FIG. 7 illustrates a final state of the sunset, where red and green lights are at intensity level 125, and white light is at intensity level 250, and duration is set to 0, thereby indicating that the lamps 401-405 should maintain the final setting until a primitive or other instruction is received that overrides the final light settings.

FIG. 7 illustrates an example sunrise effect. Other lighting designers may define other different sunrise effects, e.g., using more or less yellow light, a lower ending intensity, or using only the burst channel 406 to progress from no light to very bright light, etc. The specific set of primitives used to define each effect is secondary to the ability to define predetermined sets of primitives as effect, and then subsequently be able to execute that sequence of primitives by reference to the effect ID.

In still further examples, some effects may be defined to reference actions to be performed based on the previous effect. For example, Effect ID 2000 might indicate that the light should gradually return to a default state (e.g., whatever state the light was in prior to the start of the video program, i.e., what the viewer had set the lighting to prior to watching the video program) over some predefined or specified period of time. For example, the duration for lighting effect 2001 might indicate the amount of time over which the light should gradually return to the default state. Effect ID 2002 might be used to indicate that the final state of the previous effect should be held for the period of time specified in the duration field. Effect ID 2003 might be used to indicate a blackout, i.e., all lights off, for the period of time specified in the duration, or indefinitely if the duration is zero. Additional or different transition effects may also be defined.

Figures 8, 9:
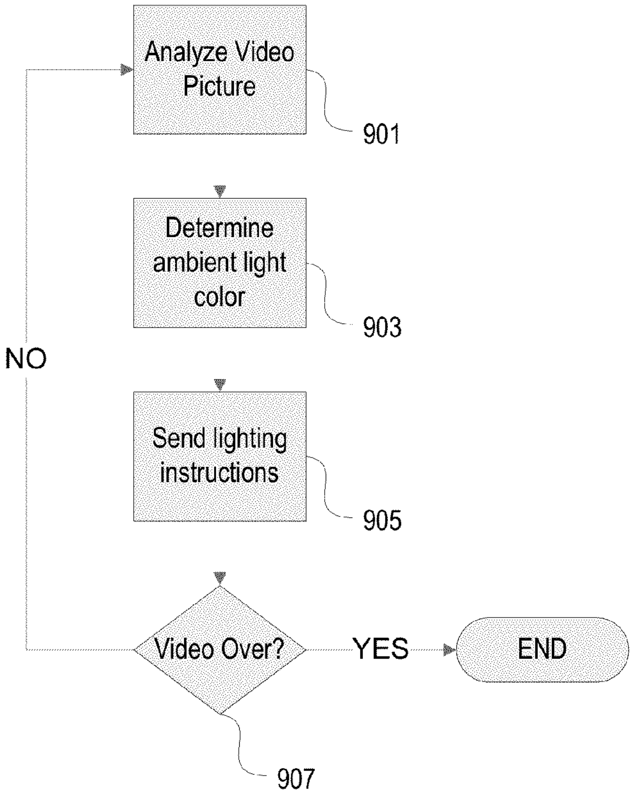
FIG. 8 shows an illustrative data structure for a lighting scheme according to one or more aspects described herein.
FIG. 9 shows an illustrative method for performing dynamic ambient lighting based on a video image according to one or more aspects described herein.

With reference to FIG. 8, an illustrative a lighting scheme 801 may be defined as a sequence of lighting effects. The scheme in this example may identify specific effects tied to particular times in a video program, may be defined as a continuous sequence of effects, or a combination of the two. FIG. 8 defines an example lighting scheme that, at 16 minutes and 34.2 seconds into a program, executes lighting Effect ID 1 (police car's flashing lights) for 10 seconds. The repeat flag is set, so Effect ID 1 will loop after completion until the 10 seconds have lapsed. Upon completion, because no transition effect is specified, each light may immediately return to its default state.

Continuing with this example, lighting scheme 801 next indicates that, at 23 minutes and 12.5 seconds, sunrise effect (Effect ID 2) is executed. The duration is set to 0, indicating that the effect is to be executed as defined by the primitives in Effect ID 2. Scheme 801 next indicates that Effect ID 2001 is executed, which by agreement refers to a gradual return to the default state of each light over the time period specified in the duration for that effect, i.e., in this example over a period of 30 seconds. The Time=0 indicates that Effect ID 2001 is to be executed immediately after the preceding effect (sunrise) is completed.

Referring to the same example, lighting scheme 801 next indicates that, at 36 minutes and 8.8 seconds, sunset effect (Effect ID 3) is executed. The duration is set to 0, indicating that the effect is to be executed as defined by the primitives defined in Effect ID 3. Scheme 801 next indicates that blackout Effect ID 2003 is immediately executed upon completion of the sunset effect, thereby causing all lights to be completely off (regardless of how the sunset effect ended) for 5 seconds. Scheme 801 next indicates that Effect ID 2001 is again executed to gradually return the lights to their default state over the time period specified in the duration for that effect, i.e., in this example over a period of 45 seconds. The Time=0 indicates that Effect ID 2001 is also to be executed immediately after the preceding effect (blackout) is completed.

Using the hardware components (lights, wireless networks, media distribution networks, etc.), primitives, effects, and schemes described above, aspects described herein provide the architecture for dynamic lighting schemes to be performed in conjunction with a media program, which will dynamically change the hue and intensity of light sources within the proximate viewing area surrounding a video in order to enhance the viewing experience.

In order to effect dynamic lighting based on the lighting primitives, effects, and schemes, in illustrative embodiments lighting controller 211 (FIG. 2) may use a ZigBee-compliant communications protocol to broadcast lighting control information for each respective light channel. Each bulb's ZigBee transceiver listens to communications received via one or more ZigBee protocols, e.g., via RF4CE over the IEEE 802.15.4 standard, as made available by the ZigBee Alliance located in San Ramon, Calif., and executes lighting instructions intended for that light source.

In some examples, before lighting primitives, effects and schemes can be effected, lighting controller 211 (FIG. 2) first executes an initialization routine to learn which light sources are located in or associated with each light channel. Many different initialization processes are possible. Regardless of which method is used, once light sources are inserted into the appropriate lamps 401-406, in illustrative embodiments lighting controller 211 learns the addresses of the light source being used for each light channel.

According to a first aspect, when each light source is manufactured it may be hardcoded to be a bulb for a specific light channel. In still further embodiments, 5.1 ("five point one") is the common name a multi-channel surround sound (e.g., six channel) system. 5.1 surround sound is the layout used in many cinemas and in home theaters. The standard employs five full bandwidth channels and one "point one" enhancement channel. 5.1 is used in digital broadcasts. Similarly, aspects of the present invention propose extending 5.1 to ambient lighting to enhance the overall cinematic experience.

In an illustrative 5.1 ambient lighting channel system (e.g., two front, two rear, one center, and one burst), light sources may be sold in kits of 6 lights bulbs, labeled appropriately for each channel, or may be sold in kits of 5 bulbs (one for each multicolor channel), and the burst channel may be sold separately. Other combinations of bulbs may be packaged together (for example, a kit of the four front and rear bulbs only), and each bulb may also be sold individually, e.g., so a consumer can replace an individual bulb that is no longer working. In this example, where a light sources' respective channels are set at manufacturing, e.g., by hardcoding the light channel in the light source, no further setup is required beyond the user ensuring that the correct bulb is inserted into its correspondingly located lamp 401-406. Subsequently, when lighting controller 211 sends commands to a bulb designated as "front right", any light source designated as a front right bulb may respond to those commands (regardless of where that light source is actually located). For example, the light source itself on the outer housing 301 may be labeled front left, front right, rear left, rear right, center, and/or burst. The user simply needs to place the correctly labeled light source in a lamp in the correct location. Alternately, the light sources can be dynamically programmed based on an interactive remote control. For example, a tablet device could activate each device detected in sequence and the user could simply drag an icon indicative of the active light source to a location on the tablet such as front left, front right, rear left, rear right, center, and/or burst.

According to a another example, each light source 300 may include a plurality of interactive control elements such as dip switches 323 through which a user can set each bulb to be on a designated channel. In the example shown in FIG. 3, three dip switches are provided, allowing each bulb to be designated for one of eight different channels (e.g., for use in up to a 7.1 system that provides two front, two middle, two rear, one center, and one burst light channel). More dip switches may be supplied in systems that support more than 8 channels. In this example, processor 311 may be configured to detect instructions based on the channel corresponding to the dip switch settings. This embodiment allows light source to be manufactured for universal use within a dynamic lighting system as described herein. However, more user input involvement is required during setup, e.g., confirming dip switch settings. In this aspect, light sources may still be sold in pre-configured kits. For example, in a kit of 5 light sources, while the bulbs might otherwise be identical for use in the five multi-color channels, each bulb might have its dip switches set at the factory to correspond to a different one of the five channels.

In yet another aspect, light source 300 may include a pairing button 325. Microprocessor may be configured, upon detecting that pairing button 325 has been pressed, to enter a pairing mode. While in the pairing mode, the processor may utilize a remote control and/or display screen to allow a user to input a code to assign a light source with a particular location such as front left, front right, rear left, rear right, center, and/or burst. For example, lighting controller may include instructions that execute a configuration wizard program. The configuration wizard program may cause device 200 to display various commands on display 206. For example, the wizard may cause one of the detected light sources to blink along with a display of message stating "Press the appropriate pairing button front left "1", front right "2", rear left "3", rear right "4", center "5", and/or burst "6"." The wizard then listens for an identification message received from user to complete the location pairing with the activated light source. In this example, when the user subsequently presses the pairing button input on the remote control, the processor thereafter associates the light source with the location selected during the pairing. In this manner, the bulb's MAC address (or other ID) is paired with location in the lighting controller 211. Lighting controller 211 records the ID as being associated with, for example, the front right channel. Similar steps may be performed for each of the other channels in use.

In yet another aspect, an RF4CE ZigBee protocol may be used to pair the lighting controller with the individual bulb devices to be controlled.

In illustrative embodiments, after lighting controller 211 has been configured (as necessary) to communicate with the appropriate light source for each light channel in use, lighting controller 211 may then dynamically alter room lighting based on the video program being displayed on TV 206. According to a first aspect, lighting controller 211 may dynamically alter the lighting in real-time based on a color analysis of the video program being performed or displayed. According to a second aspect, lighting controller 211 may dynamically alter the lighting based on a predefined lighting scheme corresponding to the program being performed or displayed. Each example is described in turn below.

With reference to FIG. 9, an illustrative method for dynamically altering lighting based on a real-time analysis of a video program is described. According to this example, device 200 may be configured with color analysis software stored on nonvolatile memory 205. Alternatively, color analysis software may reside in a lighting control adapter between device 200 and display 206. In other embodiments, the lighting control is performed remotely such as at the central location and downloaded along with the video content (e.g., online video games and/or VOD) as lighting instructions. In embodiments where color analysis software is in computing device 200, the color analysis software, when executed, in step 901 analyzes the picture being transmitted from device 200 to the TV, e.g., at a rate of 15 times per second, 30 times per second, or some other desired frequency. By examining the TV picture at a high rate (e.g., 10-60 times per second), the software in step 903 determines a background color for the lighting in the viewing area. The background color may correspond to a prominent color of the video image, a color at a periphery of the video image, or some other color selected based on the content of the video image. The color analysis software in step 905 may then send instructions to the light sources in the viewing area, e.g., via ZigBee, to adjust each light channel to specific colors and intensities as determined in step 903. In step 907, if the video program is not over, the method returns to step 901 to continue analyzing the video picture. If the video program is over, then the method ends.

According to an alternative aspect, the lighting analysis may continue until user input is received indicating user desire to end dynamic ambient lighting, rather than based on the end of a video program. In yet another alternative, device 200 may query a user at the end of a video program to determine whether to continue dynamic ambient lighting or not. Other ways of determining when the device should end ambient lighting may also or alternatively be used.

Figure 10:
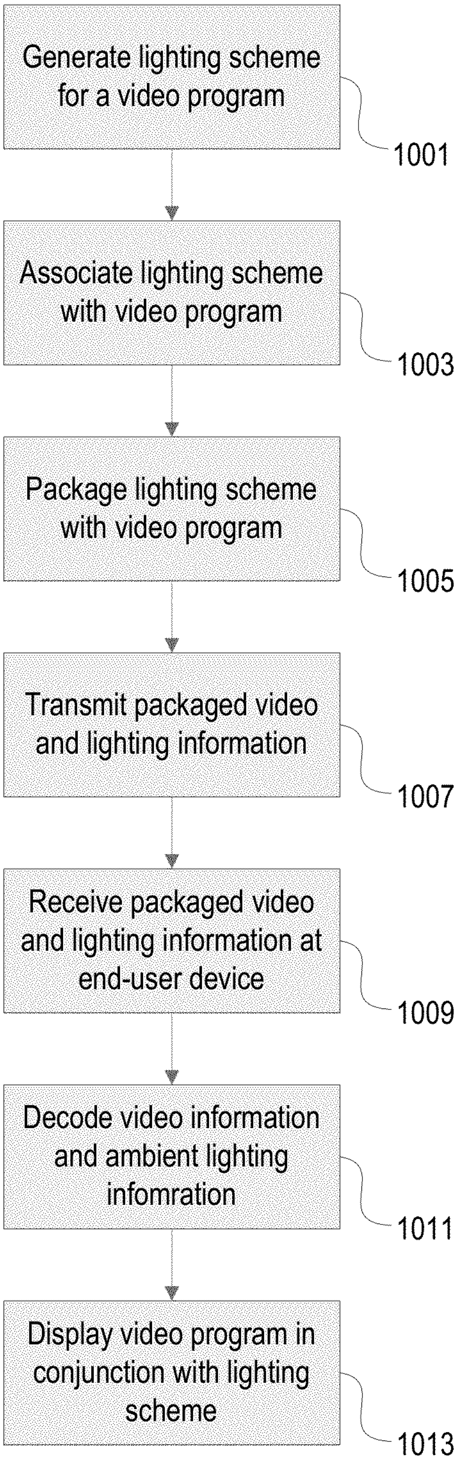
FIG. 10 shows an illustrative method for performing dynamic ambient lighting based on a predetermined lighting scheme according to one or more aspects described herein.

With reference to FIG. 10, an illustrative method for dynamically altering lighting based on a lighting scheme corresponding to a video program is described. According to an aspect, a video program may have a predetermining lighting scheme with which it is associated, e.g., created by an individual, created automatically by video analysis software such as video segmenting software, and/or a mixture of the two. According to one aspect, producers of content can insert and send lighting instructions having one or more predetermined lighting scheme in a video stream (e.g., and MPEG-2 video stream) which can control the ambient lighting as the video is being viewed, by leveraging the capabilities described above.

In this example, in step 1001, a lighting designer generates a lighting scheme based on a particular video program. The lighting designer may include a human user, using a studio application or other software, manually selecting effects to be applied within a video program, and associating those effects with specified times, durations, and/or transitions. Alternatively, the lighting designer may include automated video analysis software that automatically segments the video into various segments, detects certain events within those segments, e.g., flashing police lights, explosions, plays in a football game, touch downs, etc., and automatically applies applicable effects at corresponding times and durations in the video program, and optionally also setting a transition after the lighting effect is completed. The set of lighting effects, durations, and transitions associated with a particular video program is then saved as a lighting scheme that can be associated with that particular video program. These may be associated with the video program as lighting instructions that may be synchronized with the video either within a digital stream (e.g., MPEG stream) and/or as separate file time coded with the digital stream.

In certain examples, because multiple video schemes might be based on the same particular video program, e.g., created by two different lighting designers, in step 1003 a single lighting scheme may be selected for transmission with the particular video program. Next, in illustrative step 1005, the selected lighting scheme may be packaged for transmission with the particular video program. According to one aspect, packaging may include saving the video program and lighting scheme as a single file or set of associated files in a predetermined format for sending over a desired delivery platform. For example, in one aspect the selected lighting scheme may be intended to be sent in a synchronized MPEG-2 and/or MPEG-4 stream, e.g., using enhanced binary interchange format (EBIF), to transmit the ambient lighting scheme in a time-synchronized manner with the video program. In such an environment, the video program and lighting scheme may be saved in a format for immediate or near immediate transmissions, with little or no conversion required before transmission. In other embodiments, the files are sent as separate files and then time coded to particular segments of the MPEG stream.

In illustrative step 1007 the packaged file is transmitted to a media consumer device. Transmission may occur at or initiate from a headend 103 or other media distribution location. In step 1009 the transmission is received by a media device, e.g., device 200, a set-top box (STB), digital video recorder (DVR), computer server, or any other desired computing device capable of receiving and decoding the transmission.

In illustrative step 1011, the media device decodes the transmission into a video program and a lighting scheme, and forwards each portion to applicable hardware for further handling. In illustrative step 1013 the media device outputs the video program portion of the transmission for display on a video display screen, e.g., display 206. In this illustrative method, the media device outputs the lighting scheme to lighting controller 211 for control of an ambient lighting system as described herein. Based on the time-based information in each of the video program and the lighting scheme, the video and illustrative ambient lighting information may be performed in synchronicity with each other, thereby rendering the lighting scheme in conjunction with the video program as intended by the lighting designer.

The above aspects and information describe only one possible implementation of the dynamic ambient lighting system and methods thus far described. Many variations and alternatives are possible that allow a system to remotely control multiple light sources, using a synchronized transport stream (e.g., an MPEG-2 transport stream) or an asynchronous transmission as its communications path. A system remote from individual light sources themselves can thereby control lighting in predefined ways. For example, a movie might have encoded within its MPEG-2 transport stream, instructions for lighting in the room where the movie is being viewed. A scene in the movie might have police lights flashing. A remote command might be sent to specific bulbs in the viewing room to flash red and blue. The result is an intelligent expansion of the viewing platform.

In another illustrative embodiment, a lighting controller might query a lighting scheme database (e.g., over network 109, 210, the Internet, etc.) based on a program ID of received video content. If a lighting scheme is identified as a result of the query, the lighting controller (or other applicable component) might download the lighting scheme from the lighting scheme database for use during playback of the video content, as described herein. If more than one lighting scheme is identified as a result of the query, the lighting controller (or another applicable component) might query the user to determine which lighting scheme should be used, or may pick a lighting scheme automatically, e.g., based on an author of the lighting scheme, popularity, user feedback or reviews, or based on other information known about the lighting scheme. Once selected and downloaded, the lighting controller uses the selected lighting scheme to control ambient lighting during playback of the video content, as described herein.

Figure 11:
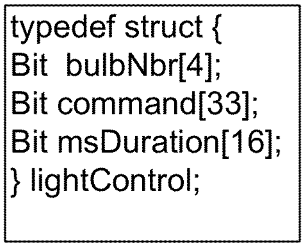
FIG. 11 shows an illustrative data structure for a lighting primitive according to one or more alternative aspects described herein.

According to one example, instead of the format shown in FIG. 5, a primitive may have the type definition illustrated in FIG. 11. Based on the structure shown in FIG. 11 for the primitive defined as lightControl, the command element may have as its most significant bit a flag enabling/disabling raw mode. When set to 0, then the following 4 bytes are composed of white, red, blue, and greed, each having 8 bits (32 bits in total) in which to convey the "raw mode" intensity value for each LED strand. When set to 1, then the following 4 bytes are used to identify a specific, agreed upon, lighting effect (or combination of lighting effects, as a sort of lighting macro). The range of integer values which can be stored in 32 bits, is 4,294,967,295. Thus there are over 4 billion possible lighting effect commands which could be predefined, optionally for each light source. The bulbNbr attribute provides 4 bits (maximum of 16 possibilities) to define the light source for which the command is intended. Thus any ambient lighting system could be used with up to 16 individual light channels. The msDuration attribute defines the number of milliseconds to apply the command, with a maximum of 65,536 milliseconds (just over 1 minute, 5 seconds) based on the 16 bit value of that field.

According to another example, the synchronized lighting scheme data, upon encapsulation within the MPEG transport stream, may be encapsulated into descriptor elements as "proprietary data" as that term is utilized in the MPEG standards. In one embodiment, the lighting instructions may be packaged as proprietary data and identified within a Program Map Table of the client device or gateway. This meta data can be utilized by the computing device 200 to control lighting and also by the program guide to show programs which are ambient lighting enabled. The computer device 200 may be configured to check the descriptor elements including the proprietary data in order recognizes that the type of proprietary data is a type which includes lighting instructions. For example, a type from within the PMT may be used, and the binary stream, synchronized to the concurrently received video and audio stream. Upon reading the lighting instructions, the computing device may be configured to broadcast data associated with the lighting instructions to 802.15.4 radio receivers embedded within each light channel's light source. According to this aspect, each light source may be configured with a specific identification. Using the field within the lightControl packet structure to determine whether the lighting control message is meant for it, a light source's processor determines whether that light source should implement the lighting instruction it has received. As discussed above, a lighting instruction might be a simple set of intensity values for each LED strand, e.g., a primitive, or alternatively the lighting instruction could be a more complex lighting effect, perhaps lasting many seconds.

According to other aspects, ambient lighting may be used to signify external events in or around the viewing area. For example, when a loud video program is playing, it may be difficult for a viewer to hear the telephone ring. Currently, media distribution systems tie in to the telephone line and may display caller ID information on a television or other display apparatus. According to an inventive aspect herein, the lighting controller may be configured to perform a specific lighting effect or scheme when a telephone rings or upon the occurrence of other predefined events not associated with the video program being watched. For example, when the phone rings, the lighting controller may cause the ambient lights to perform a strobe effect. In another example, when a doorbell is rung the lighting controller may cause the ambient lights to repeatedly transition from dim to bright and vice versa, or some other predefined effect. The processor 200 may also be configured to act as an alarm clock and have the lighting activated responsive to an alarm event such as a predetermine wakeup hour. Further, the lighting may be responsive to other events such as the laundry ending, the stove timer, the dish washer, etc. Predetermined effects may include any desired light channel(s), colors, strobes, durations, patterns, etc. The auxiliary devices such as laundry may be tied in via network 210.

According to some aspects described herein, a set-top-box or other media device may be configured to output the lighting scheme portion of the transport stream via USB or HDMI (e.g., over the consumer electronics control (CEC) data path) to an external device that includes the lighting controller and/or associated wireless transmitter. This configuration allows for set top boxes or other devices currently available, which do not have the requisite hardware installed for use in the described ambient lighting control system(s) to be retrofitted for such use. In another variation, a Digital to Analog (DTA) adapter may be used to receive streamed (e.g., via MPEG-2) lighting instructions. The latest generation of these devices includes RF4CE transmitter capability, thus there would be no need for an external adapter. The DTA adapter, in such an embodiment, may also transmit the lighting instructions to the light sources using the RF4CE transmitter.

It will thus be appreciated and understood that modifications may be made without departing from the true spirit and scope of the present disclosure. The description is thus to be regarded as illustrative instead of restrictive on the present disclosure.

What is claimed is:

1. An apparatus, comprising:

a processor; and memory storing a lighting effects database, wherein each of a plurality of lighting effects stored in the lighting effects database corresponds to a set of sequenced ambient lighting instructions for outputting the lighting effect over a plurality of light sources, and storing computer readable instructions that, when executed by the processor, configure the apparatus to control ambient lighting by:

receiving video data;

querying a lighting scheme database based on the video data to identify a lighting scheme corresponding to the video data, wherein each lighting scheme identifies a timed sequence of lighting effects;

receiving the corresponding lighting scheme;

outputting, based on the video data, video content for display on a display screen operatively connected to the apparatus;

querying the lighting effects database for a set of ambient lighting instructions corresponding to the lighting effects identified in the lighting scheme; and outputting the corresponding set of ambient lighting instructions time-synchronized with the video content, said ambient lighting instructions performing the lighting effects over a plurality of light channels, wherein each light channel is associated with a location of a different light source of the plurality of light sources in relation to a location of the display screen.

2. The apparatus of claim 1, wherein each ambient lighting instruction defines a light intensity value for each color of a multi-color light source associated with one or more of the light channels.

3. The apparatus of claim 2, wherein each ambient lighting instruction defines a light intensity value for each of a red, blue and green light emitting diode (LED) strand in the multi-color light source.

4. The apparatus of claim 3, wherein each ambient lighting instruction further defines a light intensity value for a white LED strand in the multi-color light source.

5. The apparatus of claim 1, wherein each ambient lighting instruction includes identifying information for one or more of the time sequenced lighting effects.

6. The apparatus of claim 5, wherein a first lighting effect corresponds to a set of sequenced ambient lighting instructions, that, when executed by the plurality of light sources, effect a visual light pattern simulating flashing red and blue lights on a police car.

7. The apparatus of claim 5, wherein a first lighting effect corresponds to a set of sequenced ambient lighting instructions, that, when executed by the plurality of light sources, effect a visual light pattern simulating a searchlight passing over a location of the display screen.

8. The apparatus of claim 1, wherein the plurality of light channels comprise six light channels.

9. The apparatus of claim 8, wherein one of the six light channels comprises a burst channel.

10. The apparatus of claim 1, wherein the video data comprises a program ID, and wherein querying the lighting scheme database comprises querying the lighting scheme database for one or more lighting schemes corresponding to the program ID.

11. The apparatus of claim 10, wherein the instructions further configure the apparatus to, if querying of the lighting scheme database returns a plurality of lighting schemes corresponding to the program ID, select a particular lighting scheme based on an attribute of the particular lighting scheme as compared to a similar attribute of other lighting schemes of the plurality of lighting schemes corresponding to the program ID.

12. A method comprising:

querying a lighting scheme database based on received video data to identify a first lighting scheme corresponding to the video data, wherein the first lighting scheme identifies a sequence of lighting effects time synchronized to the video data;

querying a database of lighting effects for each lighting effect identified in the first lighting scheme, wherein each lighting effect corresponds to a predefined sequence of ambient lighting instructions; and outputting, from a computing device, the corresponding ambient lighting instructions time-synchronized with the video data and configured to cause performance of the timed sequence of lighting effects over a plurality of light channels associated with a different light source in a predefined location.

13. The method of claim 12, wherein one or more of the light channels comprises a multi-color light source, wherein each ambient lighting instruction corresponding to a same channel as the multi-color light source defines a light intensity value for each color of the multi-color light source.

14. The method of claim 13, wherein each ambient lighting instruction corresponding to the same channel as the multi-color light source defines a light intensity value for each of a red, blue and green light emitting diode (LED) strand in the multi-color light source.

15. The method of claim 12, wherein each ambient lighting instruction includes identifying information for one or more of the time sequenced lighting effects.

16. The method of claim 12, wherein the plurality of light channels comprise a front right channel, a front left channel, a rear right channel, a rear left channel, a center channel and a light burst channel.

17. The method of claim 12, wherein the video data comprises a program ID, and wherein querying the lighting scheme database comprises querying the lighting scheme database for one or more lighting schemes corresponding to the program ID.

18. The method of claim 17, further comprising, if querying of the lighting scheme database returns a plurality of lighting schemes corresponding to the program ID, selecting a particular lighting scheme based on an attribute of the particular lighting scheme as compared to a similar attribute of other lighting schemes of the plurality of lighting schemes corresponding to the program ID.

* * * * *

UNITED STATES PATENT AND TRADEMARK OFFICE

CERTIFICATE OF CORRECTION

PATENT NO. : 8,878,991 B2
APPLICATION NO. : 13/326624
DATED : November 4, 2014
INVENTOR(S) : Michael J. Cook It is certified that error appears in the above-identified patent and that said Letters Patent is hereby corrected as shown below:

On the Title Page, Item (56)

Page 2, Column 2, Other Publications, Line 17:
Please delete "teh" and insert --the--

In the Specification

Column 16, Detailed Description, Line 65:
Delete "200" and insert --201--

Signed and Sealed this
Eighth Day of September, 2015

Michelle K. Lee
*Director of the United States Patent and Trademark Office*